3,375,219
PIGMENTING POLYCARBONAMIDE BY MEANS
OF AN ETHYLENE COPOLYMER CARRIER
RESIN
Howard E. Robb, Henderson, Ky., assignor to Gulf
Oil Corporation, Pittsburgh, Pa., a corporation of
Pennsylvania
No Drawing. Filed Nov. 23, 1964, Ser. No. 413,319
16 Claims. (Cl. 260—41)

ABSTRACT OF THE DISCLOSURE

Finely divided pigments are uniformly dispersed in polycarbonamide resins by admixing therewith a compatible ethylene copolymer carrier resin, said carrier resin neither reacting with nor detracting from the properties of the polycarbonamide and containing therein the finely divided pigment uniformly distributed throughout the carrier resin.

---

This invention relates to polymers and more particularly to compositions comprising homogeneous mixtures of fillers and polyamide resins of the nylon type.

The addition of fillers or pigments, such as carbon black, to polyamide resins, of the nylon type, for pigmentation and/or for stabilization is known. Heretofore, the addition of such fillers was effected by their mere mechanical blending in the polyamides. However, in addition to the difficulty of mechanically obtaining a uniform and homogenous dispersion of the filler in the resin, the inclusion of such fillers in the polyamides resulted in compositions which were not only difficult to work but which were very brittle and difficult to fabricate by conventional procedures. For example, in the case of mechanically blending 2% carbon black in the resin for improved light stability, a very brittle polymer results. As a result, the carbon black is added in practice during polymerization in order to obtain good physical properties in the polymer. Not only is this not a satisfactory method from an economical standpoint but, in addition, presents a very obvious problem in clean-up.

Accordingly, it is an object of this invention to eliminate disadvantages of the prior art.

It is another object of this invention to provide a novel process for incorporating fillers in polyamide resins of the nylon type.

It is also an object of this invention to provide a novel process for dispersing fillers in polyamide resins.

A further object of this invention is to provide a novel process for preparing polyamide resins containing fillers which are easily compounded, shaped and fabricated into ductile and non-brittle products.

A still further object of this invention is to provide novel compositions of polyamide resins having fillers dispersed uniformly therein.

It has been discovered, in accordance with this invention, that finely divided pigments can be uniformly dispersed in polycarbonamide base resins by means of a compatible carrier resin which neither reacts with nor detracts from the properties of the polycarbonamide to any substantial extent. The resultant compositions are easily shaped and/or fabricated into ductile and non-brittle products.

By polycarbonamides are meant and intended commercial nylon and polyamide resins having recurring amide groups as integral parts of a molecular chain structure characterized by amide links and hydrocarbon links along the chain. Typical of these polycarbonamides is the product commercially known as nylon 6 which is obtained by the polymerization of caprolactam. Another typical polycarbonamide is that obtained by the condensation of a dibasic organic acid (e.g., adipic and sebacic) and a diamine (e.g., hexamethylene diamine). A further illustrative polycarbonamide is the copolymer of an amino acid or the lactam thereof (e.g., caprolactam), a dibasic organic acid (e.g., isophthalic acid) and a diamine (e.g., m-xylylene diamine). In general, these polycarbonamides will have a molecular weight in excess of 20,000.

The filler for incorporation into the polycarbonamide can be any of the conventional pigments and coloring agents and loading agents normally employed with the resin, either for decorative (coloring) effect, for stabilization against ultra-violet degradation or for loading of the polymer. Typical of such fillers are carbon black, magnesium silicate, iron filings, asbestos fibers, glass fibers, ground glass,, various metallic bronze powders, such as aluminum, gold or copper bronze, titanium dioxide, iron blue, chrome green and the like. The particle sizes of these fillers are not critical, and they may be subdivided to the particle sizes required for the desired application of the resin. For example, the carbon black (forming a preferred embodiment of this invention) either of the channel or furnace black variety and having a particle size of from about 50 to about 350 angstroms are suitable for use in invention. A particularly preferred particle size for the carbon black is of the order of 50 to 200 angstroms.

The carrier resin for the filler is normally a copolymer which is compatible with the polycarbonamide base resin, and which will completely wet the filler. In general, the carrier resin will be a copolymer of ethylene with a comonomer having up to six carbon atoms and containing at least one carbonyl grouping. More specifically, the carrier resin will comprise a copolymer of ethylene with a comonomer such as vinyl acetate, acrylic acid and alkyl esters thereof, methacrylic acids and alkyl esters thereof, fumaric acids and alkyl esters thereof, maleic anhydride, maleic acids and alkyl esters thereof, and the like. Normally, these copolymers will have a Melt Index of 0.1 to about 2,000 and preferably of about 1.5 to 15.

The methods of preparing these copolymers are not critical, and they may be prepared by any various processes known in the art, typical of which are those found in patents such as U.S. 2,200,429, U.S. 2,395,381, U.S. 2,599,123, U.S. 2,703,794 and U.S. 2,953,551.

Particularly effective carrier resins within this invention are the copolymers of ethylene-acrylate esters and ethylenemethacrylate esters. In general, these copolymers will be formed by the copolymerization of ethylene with either an alkyl ester of acrylic acid or an alkyl ester of methacrylic acid, with the invention being described with particular reference to a copolymer of ethylene and methyl acrylate.

Specific esters suitable for the formation of the copolymer include such as the methyl, ethyl, propyl, isopropyl, butyl, isobutyl, hexyl, t-butyl, 2-ethylhexyl, decyl, lauryl and stearyl esters of the various acids. As will be obvious to those skilled in the art, the alkyl portion of the alkyl esters may also have, if desired, certain simple substituents which do not detract from or interfere with the desired properties of the base resin when incorporated therein.

These preferred ethylene-acrylate ester and ethylenemethacrylate ester copolymers are known in the art, and can be prepared by the processes of U.S. Patents No. 2,200,492 and No. 2,953,551, as identified above. A particularly effective class of such copolymers is disclosed in British Patent No. 900,969. These copolymers have a highly uniform distribution of the acrylate ester or methacrylate ester in the copolymer, and accordingly the teachings of this British patent are incorporated herein by reference thereto. Particularly effective of these copolymers are those formed by the polymerization of ethylene and methyl acrylate having from about 15 to about 40 percent, by weight of the copolymer, of the combined methyl acrylate, and with a Melt Index of about 2 to about 2,000. A particularly effective copolymer of ethylene and methyl acrylate is that having about 20 percent of the combined methyl acrylate and with a Melt Index of about 1.5 to 15.

Generally, the final product (polycarbonamide base resin/copolymer carrier resin/filler) will, in accordance with this invention, contain, by weight of the final product, 45 to 99 percent of the polycarbonamide, 0.5 to 15 percent of the copolymer carrier resin, and from about 0.01 to 40 percent of the filler.

Normally, where the polycarbonamide is to be filled with pigment for coloring purposes, the foregoing broad ranges will be generally restricted for this purpose to 90–99 percent of the polycarbonamide, 0.5 to 10 percent of the copolymer carrier resin and 0.01 to 9.0 percent filler; and, conversely, for loading purposes (as with asbestos and glass fibers) the broad ranges for such application will normally be 30 to 90 percent polycarbonamide, 10 to 15 percent copolymer carrier resin and 10 to 60 percent filler.

Preferably, this final product will comprise 75 to 99 percent of the polycarbonamide, 0.5 to 5 percent of the carrier resin, and 0.02 to 20 percent of the filler.

Again, where the resins are to be filled with pigment for coloring purposes, the preferred ranges are 0.02 to 4.0 percent filler, 95 to 99 percent polycarbonamide resin and 0.8 to 4.8 percent copolymer carrier resin; and where the filler is employed for loading of the resin (as with asbestos and glass fibers), the preferred ranges are 75 to 90 percent polycarbonamide, 0.5 to 5.0 percent copolymer carrier resin and 10 to 20 percent filler.

In practice, and in accordance with this invention, it is essential that the carrier resin and the filler are blended together first. In this respect, they may be mechanically mixed together by conventional techniques, such as mill mixing, Banburying or mixing screws, to form a master batch or concentrate having a highly uniform dispersion or distribution of the filler in, and substantially completely wetted by, the carrier resin. The concentrate can then be forced through an extruder and cut or subdivided into pellet form of any desired size. As will be readily seen, the weight ratio of carrier resin to filler is necessarily dictated by the desired proportion of the components in the final product of this invention. For example, if the final product is to contain equal amounts of the carrier resin and the filler, the concentrate will be formed with equal amounts of the carrier resin and the filler, e.g., a 1/1 ratio.

Similarly, if the final product is to be comprised of 91 percent polycarbonamide, 7 percent of carrier resin and 2 percent filler, the concentrate will be formed from a 7/2 ratio of carrier resin to filler, in other words, 7 parts, by weight, of the carrier resin and 2 parts of the filler. Nine parts, by weight, of this concentrate is then added to 91 parts of the polycarbonamide to provide the desired composition of this final product.

Likewise, if the final product is to be comprised of 90 percent polycarbonamide, 4 percent carrier resin and 6 percent filler, the concentrate will be formed from a 2/3 ratio of carrier resin to filler, in other words, 2 parts of carrier resin and 3 parts of filler. The admixture of 10 parts, by weight, of this concentrate with 90 parts of the polycarbonamide provides the desired composition of this final product.

Generally, to conform to the broad and narrow range defined for the desired final product, the composition concentrate will be prepared respectively to contain 20 to 70 percent, by weight, of the carrier resin, and 30 to 80 percent, by weight, of filler, and preferably 40 to 60 percent, by weight, of the carrier resin and 60 to 40 percent, by weight, of the filler.

However, where the concentrate is to be employed in the resin for coloring purposes, the preferred range of the filler will be about 30 percent to about 50 percent; and where the concentrate is to be employed in the resin for loading thereof, as with asbestos and glass fibers, the preferred range of the filler in the concentrate is from about 60 percent to about 90 percent with the amount of carrier resin being minimized. It is only necessary that the filler be substantially completely wetted by the carrier resin in order to effect its incorporation into the base resin, in accordance with this invention.

A measured quantity of this concentrate (usually pelletized) is added to a measured quantity of the polycarbonamide base resin (also normally pelletized), and the mixture suitably malaxated by conventional means to homogenize the mixture to the degree of uniformity required or desired. As with the preparation of the concentrate, the homogenization of the concentrate/polycarbonamide mixture can be effected by conventional means such as mill mixing, Banburying and extruding. In both cases, as will be appreciated, the uniformity of the filler/carrier resin concentrate and of the concentrate/polycarbonamide mixture is effected by the shearing and elevated temperatures encountered during the mixing thereof by mill mixing, Banburying and extruding techniques.

A typical resin composition of this invention comprises, by weight, about 96 percent of nylon 6 (condensation product of caprolactam), about 2 percent of a copolymer of ethylene and methyl acrylate (having 20 weight percent of combined methyl acrylate and a Melt Index of 2) and 2 percent of carbon black.

This composition is obtained by first preparing a master batch or concentrate of about 50 percent, by weight, of the ethylene methyl acrylate copolymer and about 50 percent, by weight, of finely divided carbon black by mechanically mixing the mixture at 240° F. to 260° F. in a Banbury, to uniformly disperse the carbon black and to completely wet the carbon black with the copolymer. The homogenized mixture is then subdivided into the desired size by extrusion followed by pelletizing.

About four parts, by weight, of this concentrate are then admixed with 96 parts, by weight, of nylon 6, and the entire mixture is then homogenized at 440° F. to 460° F., or higher if desired, in an extruder or Banbury, and then extruded and pelletized. It was found, in accordance with this invention, that the copolymer is compatible with, and has no deleterious effect upon, nylon 6. In addition, it was also found that not only does the copolymer act as an effective carrier for the carbon black, but also effects a substantially complete homogenous dispersion of the carbon black in the nylon 6. The final product was found to be comparable to nylon 6 and was also found to be very ductile and not brittle. The compositions of this invention can be used as is or admixed with other conventional additives, e.g., plasticizer, for further shaping and fabrication by injection molding, extruding and other conventional techniques into rod, sheet, film, tubes and other articles.

Although the invention has been described with reference to specific materials, embodiments and details, various modifications and changes, within the scope of this invention, will be apparent to one skilled in the art and are contemplated to be embraced within the invention.

What is claimed is:
1. A composition comprising a physical admixture of
   (a) 30 to 99 percent of a polycarbonamide having recurring carbonamide groups as an integral part of the polymer chain, and
   (b) 1 to 70 percent of a concentrate comprised of a copolymer of ethylene with a comonomer selected from the group consisting of vinyl acetate, alkyl esters of acrylic acid, alkyl esters of methacrylic acid, maleic anhydride, alkyl esters of fumaric acid and alkyl esters of maleic acid, with said copolymer having a melt index in the range of from 0.1 to about 2000 and having uniformly dispersed therein 20 to 70 percent of a particulate filler.

2. A composition comprising, by weight:
   (a) 30 to 99 percent of a polycarbonamide having recurring carbonamide groups as an integral part of the polymer chain,
   (b) 0.5 to 15 percent of a compatible copolymer of ethylene and a comonomer selected from the class consisting of vinyl acetate, alkyl esters of acrylic acid, alkyl esters of methacrylic acid, maleic anhydride, alkyl esters of fumaric acid, and alkyl esters of maleic acid, said copolymer having a melt index in the range from 0.1 to about 2,000, and
   (c) 0.01 to 60 percent of a particulate filler that disperses compatibly in said polycarbonamide alone, if at all, with great difficulty.

3. The composition of claim 2 wherein said filler is carbon black.

4. The composition of claim 2 wherein said filler is a coloring agent in the range of 0.02 to 4.0 percent, and said polycarbonamide is in the range of 90 to 99 percent.

5. The composition of claim 2 wherein said comonomer is methyl acrylate the concentration of said methyl acrylate in said copolymer being in the range from about 15 to about 40% by weight of said copolymer.

6. The composition of claim 5 wherein said filler is carbon black.

7. A composition comprising, by weight:
   (a) 75 to 99 percent of a polycarbonamide having recurring carbonamide groups as an integral part of the polymer chain,
   (b) 0.5 to 5.0 percent of a compatible copolymer of ethylene and a comonomer selected from the class consisting of vinyl acetate, alkyl esters of acrylic acid, alkyl esters of methacrylic acid, maleic anhydride, alkyl esters of fumaric acid, and alkyl esters of maleic acid, said copolymer having a melt index in the range from 0.1 to about 2,000, and
   (c) 0.02 to 20 percent of a particulate filler that disperses compatibly in said polycarbonamide alone, if at all, with great difficulty.

8. The composition of claim 7 wherein said filler is carbon black.

9. The composition of claim 7 wherein said filler is a coloring agent in the range of 0.02 percent to about 4.0 percent.

10. A composition comprising, by weight:
    (a) 96 percent of a polyamide of caprolactam,
    (b) 2 percent of a copolymer of ethylene and methyl acrylate the concentration of methyl acrylate in said copolymer being in the range from about 15 to 40% by weight of said copolymer, and
    (c) 2 percent of finely divided carbon black.

11. A composition comprising a physical admixture of
    (a) a particulate polycarbonamide having recurring carbonamide groups as an integral part of the polymer chain, and
    (b) a particulate copolymer of ethylene with a comonomer selected from the class consisting of vinyl acetate, alkyl esters of fumaric acid, maleic acid, maleic anhydride, with said copolymer having a melt index in the range of 0.1 to about 2,000 and having uniformly dispersed therein a particulate filler.

12. The composition of claim 11 wherein said filler is carbon black.

13. The composition of claim 11 wherein said filler is a coloring agent.

14. A composition comprising a physical admixture, by weight, of:
    (a) 99 to 50 percent of a polyamide,
    (b) 0.5 to 50 percent of a concentrate comprised of, weight, 30 to 80 percent of a particulate uniformly dispersed in 70 to 20 percent of a copolymer of ethylene with a comonomer selected from the class consisting of vinyl acetate, alkyl esters of acrylic acid, alkyl esters of methacrylic acid, maleic anhydride, alkyl esters of fumaric acid, and alkyl esters of maleic acid, said copolymer having a melt index in the range from 0.1 to about 2,000.

15. A composition of claim 14 wherein said filler is carbon black.

16. A composition comprising a physical admixture of:
    (a) 96 percent of a particulate polyamide of caprolactam, and
    (b) 4 percent of an additive comprised of 50 percent of finely divided carbon black, uniformly dispersed in 50 percent, by weight, of a copolymer of ethylene and methyl acrylate, the concentration of methyl acrylate in said copolymer being in the range from about 15 to 40% by weight based on the weight of said copolymer.

References Cited

UNITED STATES PATENTS

| | | | |
|---|---|---|---|
| 2,649,382 | 8/1953 | Vesce | 260—41 |
| 2,786,822 | 3/1957 | Vesce | 260—41 |
| 3,236,802 | 2/1966 | Ferigno | 260—41 |

FOREIGN PATENTS

| | | |
|---|---|---|
| 740,501 | 8/1963 | Canada. |

MORRIS LIEBMAN, *Primary Examiner.*

JULIUS FROME, *Examiner.*

S. L. FOX, *Assistant Examiner.*